(12) United States Patent
Choi et al.

(10) Patent No.: US 12,214,495 B2
(45) Date of Patent: Feb. 4, 2025

(54) METHOD FOR LEARNING ROBOT TASK AND ROBOT SYSTEM USING THE SAME

(71) Applicant: NAVER CORPORATION, Seongnam-si (KR)

(72) Inventors: Keunjun Choi, Seongnam-si (KR); Hyoshin Myung, Seongnam-si (KR); Mihyun Ko, Seongnam-si (KR); Jinwon Pyo, Seongnam-si (KR); Jaesung Oh, Seongnam-si (KR); Taeyoon Lee, Seongnam-si (KR); Changwoo Park, Seongnam-si (KR); Hoji Lee, Seongnam-si (KR); SungPyo Lee, Seongnam-si (KR)

(73) Assignee: NAVER Corporation, Gyeonggi-do (KR)

( * ) Notice: Subject to any disclaimer, the term of this patent is extended or adjusted under 35 U.S.C. 154(b) by 166 days.

(21) Appl. No.: 17/382,569

(22) Filed: Jul. 22, 2021

(65) Prior Publication Data
US 2022/0032451 A1 Feb. 3, 2022

(30) Foreign Application Priority Data
Jul. 30, 2020 (KR) ........................ 10-2020-0095258

(51) Int. Cl.
*G05B 19/427* (2006.01)
*B25J 9/16* (2006.01)
(Continued)

(52) U.S. Cl.
CPC ............. *B25J 9/163* (2013.01); *B25J 9/1697* (2013.01); *B25J 13/006* (2013.01); *B25J 13/025* (2013.01); *B25J 13/085* (2013.01)

(58) Field of Classification Search
CPC ........ B25J 9/163; B25J 9/1697; B25J 13/006; B25J 13/025; B25J 13/085; B25J 9/1656;
(Continued)

(56) References Cited

U.S. PATENT DOCUMENTS 9,862,099 B1 * 1/2018 Linnell ................. G06F 3/0362
9,919,424 B1   3/2018 Devengenzo
(Continued)

FOREIGN PATENT DOCUMENTS

EP            3495094 A1 *  6/2019  ............ B25J 13/025
JP         2000-006068 A    1/2000
(Continued)

OTHER PUBLICATIONS

Calandra et al., "More Than a Feeling: Learning to Grasp and Regrasp Using Vision and Touch," Oct. 2018 (Year: 2018).*
(Continued)

*Primary Examiner* — Adam R Mott
*Assistant Examiner* — Byron Xavier Kasper
(74) *Attorney, Agent, or Firm* — Harness, Dickey & Pierce, P.L.C.

(57) ABSTRACT

The present invention relates to methods for learning a robot task and robots systems using the same. A robot system may include a robot configured to perform a task, and detect force information related to the task, a haptic controller configured to be manipulatable for teaching the robot, the haptic controller configured to output a haptic feedback based on the force information while teaching of the task to the robot is performed, a sensor configured to sense first information related to a task environment of the robot and second information related to a driving state of the robot, while the teaching is performed by the haptic controller for outputting the haptic feedback, and a computer configured to learn a motion of the robot related to the task, by using the first
(Continued)

information and the second information, such that the robot autonomously performs the task.

20 Claims, 13 Drawing Sheets

(51) Int. Cl.
*B25J 13/00* (2006.01)
*B25J 13/02* (2006.01)
*B25J 13/08* (2006.01)

(58) Field of Classification Search
CPC ...... B25J 9/1689; B25J 13/087; B25J 13/088; G05B 2219/39311; G05B 2219/36455; G05B 2219/39319; G05B 2219/40391; G05B 2219/40619; G05B 2219/45216; G05B 19/427; G05B 19/247
See application file for complete search history.

(56) References Cited

U.S. PATENT DOCUMENTS

| 10,201,903 | B1* | 2/2019 | Linnell | G06F 3/04886 |
|---|---|---|---|---|
| 10,589,428 | B1* | 3/2020 | Linnell | B25J 13/06 |
| 10,919,152 | B1* | 2/2021 | Kalouche | B25J 9/1697 |
| 2013/0345872 | A1 | 12/2013 | Brooks et al. | |
| 2015/0127150 | A1* | 5/2015 | Ponulak | G05D 1/0088 |
| | | | | 700/250 |
| 2016/0029050 | A1 | 1/2016 | Thornburgh | |
| 2016/0243701 | A1 | 8/2016 | Gildert et al. | |
| 2018/0154519 | A1* | 6/2018 | Lin | B25J 13/085 |
| 2019/0047143 | A1* | 2/2019 | Matsudaira | B25J 13/085 |
| 2019/0248006 | A1* | 8/2019 | Takahashi | B25J 9/161 |
| 2019/0248007 | A1* | 8/2019 | Duffy | B25J 15/0066 |
| 2020/0039064 | A1* | 2/2020 | McKinley | B25J 17/0208 |
| 2020/0398423 | A1* | 12/2020 | Hane | B25J 9/163 |
| 2021/0031358 | A1* | 2/2021 | Sakaino | B25J 3/00 |
| 2022/0097230 | A1* | 3/2022 | Kawabe | A63H 13/02 |
| 2022/0314133 | A1* | 10/2022 | Yokono | B25J 9/1697 |

FOREIGN PATENT DOCUMENTS

| JP | 2016-196079 A | 11/2016 |
|---|---|---|
| JP | 2020-026002 A | 2/2020 |
| KR | 10-2019-0140546 A | 12/2019 |
| WO | WO-2019/202900 A1 | 10/2019 |

OTHER PUBLICATIONS

Notice of Allowance dated Jan. 17, 2023 issued in corresponding Japanese Patent Application No. 2021-122297.
Japanese Office Action dated Sep. 20, 2021 issued in Japanese Patent Application No. 2021-122297.
Korean Office Action dated Jul. 26, 2021 issued in corresponding Korean Patent Application No. 10-2020-0095258.
Chung Hyuk Park, et al. "Transfer of Skills between Human Operators through Haptic Training with Robot Coordination," IEEE Conference on Robotics and Automation, pp. 229-235 (2010).

* cited by examiner

METHOD FOR LEARNING ROBOT TASK AND ROBOT SYSTEM USING THE SAME

CROSS-REFERENCE TO RELATED APPLICATION

Pursuant to 35 U.S.C. § 119(a), this application claims the benefit of the earlier filing date and the right of priority to Korean Patent Application No. 10-2020-0095258, filed on Jul. 30, 2020, the contents of which is incorporated by reference herein in its entirety.

BACKGROUND

1. Technical Field

Example embodiments relate to methods for learning a robot task by using a remote control device, and/or robot systems using the same.

2. Description of the Related Art

Due to an aging society around the world, social problems such as decrease of the working population and increase of labor costs are generated. Because of such problems, automation is highly required across industries, and automation through a robot is being spotlighted as a solution. According to such a trend, there is a high tendency to replace a manpower by a robot in many fields of the society.

However, in the conventional robot manufacturing market, a robot technology is concentrated to a method to perform simple and repetitive tasks rapidly and precisely. This causes a difficulty in flexibly dealing with a demand of automation using a robot in a new industry field such as electrical and electronic fields and a logistics field. For instance, it is improper to apply the conventional robot technology for performing a uniform task repetitively to manufacture electric and electronic components, due to a difficulty in standardizing processes, a relatively high difficulty of a task, and a relatively very short lifespan of a production line. Further, in case of a logistics service field, a robot task cannot be standardized, and handling various situations is required. For instance, a robot which performs a delivery service should lift delivery products of various weights, and the robot should perform a proper control according to a weight of each delivery product. Different types of tasks require different "force information", and a robot has a difficulty in performing various tasks requiring different force information according to types of the tasks.

Further, in case of a housework service field, various situations may occur, and force information is required in this case. More specifically, many tasks performed in a daily life space may require information related to a force in order to express the tasks. For instance, in order to perform a 'task to spread butter on bread', a robot should move with pressing butter by a dessert knife. Here, a result of the 'task to spread butter on bread' becomes different according to a pressing force. Also, the result of the task may become different according to the degree of toughness of the butter, the degree of toughness of the bread, etc.

As another example, in case of expressing a task to be performed by a robot, force information may be required. More specifically, in case of 'a task to detach scotch tape on a desk' or 'a task to remove stains on a desk by using a towel', etc., the task may be expressed more precisely through information such as a size or a direction of a required force. Recently, an intelligent robot technology to make a robot learn a task attracts attention. Methods to make a robot learn a task that are being actively researched may include a teaching pendant method, a kinesthetic teaching method, a teleoperation method, a hard coding method, etc.

However, such methods are improper to make a robot learn a task requiring force information.

More specifically, the teaching pendant method is to store information of a position and a posture, and describes a task learning method. The kinesthetic teaching method has a problem that a robot has a difficulty in discerning whether a force transmitted from a person is for teaching or is required for a task, because the person moves with holding the robot.

In case of the teleoperation method, force information cannot be contained in a task because only information on a person's posture is transferred to a robot. Further, in case of the hard coding method, flexibility for a complicated task is relatively low, and each task should undergo a programming process.

Accordingly, there still exist needs to a new type of method to learn a robot task capable of solving such problems, and a robot system capable of performing a task requiring force information.

SUMMARY

Therefore, an aspect of the present disclosure is to provide a new learning model which allows a robot to effectively learn and perform various and complicated tasks.

Another aspect of the present disclosure is to provide a method for learning a robot task based on force information, and a system using the same.

Some example embodiments provide methods and/or system capable of newly defining a robot task based on information of a force generated at the time of performing the robot task. Some example embodiments provide methods and/or systems capable of performing a learning more effectively by a multi-joint robot having a high degree of freedom.

Some example embodiments provide learning methods and/or systems capable of reflecting an intention of a user who teaches a robot such that a task is autonomously performed by reflecting an external environment.

Further, some example embodiments provide methods capable of reflecting an external environment at the time of teaching a task, and/or learning methods and/or systems capable of effectively acquiring learning data.

Further, some example embodiments provide field technologies for conveniently instructing a new task according to a changed task environment in an industry field or a service field.

In order to achieve these and other advantages and in accordance with the purpose of this disclosure, a robot system uses a process that an expert demonstrates a task by using a haptic manipulating device which transfers a force, and a robot device learns the task.

According to an example embodiment, the robot system includes a robot configured to perform a task, and detect force information related to the task, a haptic controller configured to be manipulatable for teaching the robot, the haptic controller configured to output a haptic feedback based on the force information while teaching of the task to the robot is performed, a sensor configured to sense first information related to a task environment of the robot and second information related to a driving state of the robot, while the teaching is performed by the haptic controller for outputting the haptic feedback, and a computer configured to learn a motion of the robot related to the task, by using the first information and the second information, such that the robot device autonomously performs the task.

The sensor may be configured to detect an external force applied to the robot while the teaching is performed by the haptic controller, and the haptic controller may be configured to output the haptic feedback based on the external force.

The haptic feedback may be implemented as a force corresponding to the external force that is transmitted by the haptic controller to a user, for the teaching of the task to the robot based on the force information. Both the first information relating to the task environment of the robot and the second information relating to the driving state of the robot may changes according to the teaching of the task to the robot based on the force information.

The robot device may include a lower controller configured to receive a teaching command of the task, from the haptic controller, a driver configured to perform a driving according to the teaching command, under control of the lower controller, and an upper controller configured to drive the driver by controlling the lower controller.

The lower controller may be configured to control the driver by receiving the teaching command from the haptic controller, and transmit the force information to the haptic controller as haptic information.

The computer may be configured to derive at least a part of the upper controller by performing learning of the motion of the robot related to the task based on the first information and the second information. The upper controller may be configured to generate a control command with respect to the lower controller such that the robot autonomously performs the task based on the learning. Also, the upper controller may include a first controller preset to drive the robot, and a second controller derived by the learning and configured to interwork with the first controller.

The first information and the second information may be stored in a database as time-series data together with the teaching command, and the computer may be configured to derive the upper controller by using the time-series data.

The driver may include a motor configured to be driven in a quasi-direct-drive manner. And the sensor may be configured to detect the force information by sensing a force applied to an output terminal of the motor as an electric energy of an input terminal.

In a robot which can undergo teaching of a task through device haptic controller according to some example embodiments of the present disclosure, learning data may be obtained to learn another controller, while teaching of a task is performed through one controller.

According to an example embodiment, the robot includes a first controller configured to receive a teaching command of a task, from a device haptic controller, a driver having a multi-joint and configured to perform a driving according to the teaching command under control of the first controller, a sensor configured to sense first information related to a task environment of the robot and second information related to a driving state of the robot, while the driver is driven under the control of the first controller; and a second controller configured to drive the driver by controlling the first controller. The robot may be configured to perform learning of the task by using the first information and the second information. And the second controller may be configured to generate a control command with respect to the first controller such that the robot autonomously performs the task based on the learning of the task.

According to an example embodiment, a method for learning a robot task includes performing teaching of a robot task based on an external manipulation of a haptic controller, transmitting a driving command corresponding to the external manipulation to a robot by the haptic controller, and outputting a haptic feedback by receiving information related to a force generated from the robot task, from the robot, sensing first information related to a task environment of the robot and second information related to a driving state of the robot, while the robot performs the robot task according to the driving command, and performing learning of the robot task by using the first information and the second information.

In the method for learning a robot task and the robot system according to some example embodiments of the present disclosure, a robot task is defined based on force information between the robot and the external environment, such that the robot easily learns various and complicated tasks. Thus, some example embodiments of the present disclosure may implement a learning method which handles a change of a task environment more flexibly.

A definition of a robot task using information about a posture and a position has a problem that a new modeling should be derived when an external environment changes. However, according to some example embodiments, as a new type of robot task is defined based on force information, such a problem can be solved.

Further, according to some example embodiments, as the interface device having a haptic function is used, an expert performs teaching of the robot by having feedback from a force applied to the robot in a substantial (or actual or practical) environment. That is, task teaching based on a force may be performed in various environments. In this case, the robot acquires information for a task in a substantial environment, and utilizes to learning. Accordingly, the robot may learn a task relating to force information.

In this case, a person's physical intelligence may be converted into a language of the robot (first information and second information) for learning. And how to behave by a person according to a task environment (first information) may be analogized and learned through various information (first information and second information) in the teaching step. Further, according to some example embodiments of the present disclosure, because the robot may learn an expert's task command, a multi-joint robot may perform a more effective learning. According to some example embodiments of the present disclosure, a plurality of tasks can be handled flexibly at various situations, because learning is performed by using a high degree of freedom of the multi-joint robot. Thus, the robot may perform a new task rapidly, by using learning information on a past task as learning information on a new task.

Like this, according to some example embodiments, past learning data and learning results are used, and learning is performed based on information obtained as the robot directly performs a task through an expert and a haptic device. Therefore, the learning by the robot may be performed only through a small number of teachings and demonstrations. Further, as a teaching may be performed by using a haptic device without each programming to operate the robot at each different task, time and efforts taken for a learning by the robot may be reduced. Further, according to some example embodiments of the present disclosure, the lower controller transmits and receives information with the interface device in the teaching step, and the upper controller is derived in the learning step based on the information obtained in the teaching step. This can allow a learning and a robot control to be performed more efficiently.

Further, according to some example embodiments, because data obtained from various sensors is used, learning of the upper controller capable of flexibly handling various situations can be performed.

According to some example embodiments, the upper controller may be implemented as a common middleware, and may include task programs for different robots. This may allow a replacement of the robot, a change of a task plan, or observance of a safety standard by the robot, to be performed more easily.

DETAILED DESCRIPTION

Figure 1A:
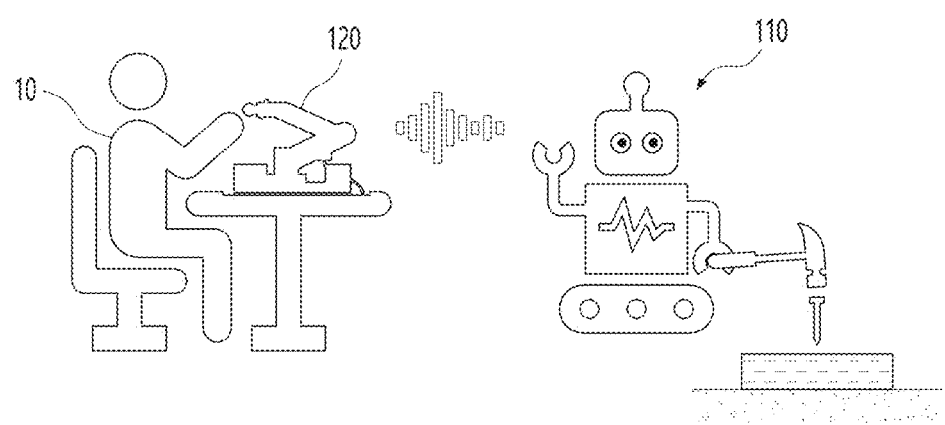
FIGS. 1A and 1B are conceptual views for explaining a method for learning a robot task and a task execution according to an example embodiment.

Description will now be given in detail according to some example embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the disclosure, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the example embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the disclosure, and it is also understood that greater or fewer features, numbers, steps, functions, several components, or combinations thereof may likewise be utilized.

Example embodiments provide methods for learning a robot task by using a remote controller (or an interface device) having a haptic function, and/or systems using the same.

Here, the haptic is a computer tactile technique, and more particularly, means a technique to allow a user to feel a tactile sense, a force, a sense of movement, etc. through a user input unit. In this case, the tactile sense, the force, the sense of movement may be implemented by air injection, a temperature control, etc. As another example, the haptic may be implemented to allow a user to feel through a muscle sense such as a finger and an arm. Also, a haptic feedback explained in the present disclosure means techniques to allow a user to feel a tactile sense, a force, a sense of movement, etc., by using a feedback through an input device.

Like this, some example embodiments of the present disclosure allow a user of a remote controller for a robot to recognize a force generated from the robot at a practical operation environment, by outputting a haptic feedback to the remote controller.

In this disclosure, the robot indicates a machine (i) having a similar function to a human, or a mechanical device (ii) which is programmable by one or more computer programs and which automatically performs a complex series of actions. As another example, the robot may mean a machine having a form and having an ability to think by itself.

For example, the robot in this disclosure may be an industrial robot which performs an assembly, a welding, a handling, etc. at a manufacturing process in a functional aspect, or an intelligent robot to recognize environments and having a function to determine by itself. In another example, the robot in this disclosure may be configured to perform a plurality of functions (not a single function) in a composite manner.

Further, the robot in this disclosure may be an android robot similar to a human in shape and behavior, a humanoid robot similar to a human in a body structure, a cyborg that a part of a human body has been remodeled into a machine, etc.

In some example embodiments, in the aspect of use, the robot in this disclosure may include a service robot for personal and private use such as a cleaning robot, an entertaining robot, an education robot and a rehabilitation robot, a service robot for professional use such as a leading (conducting) robot, a firefighting robot, a medical robot, a delivery robot, a disaster rescue robot, a moving robot, a housework robot and a kitchen robot, an industrial robot such as a welding robot, a painting robot and a transfer robot, a military robot such as a fight robot and a patrol robot, etc.

Meanwhile, in order to implement the aforementioned functions or uses, the robot in this disclosure may be provided with an actuator, a control system, an end effector, a manipulator, a sensor, etc.

According to some example embodiments, the robot may be configured as a multi-joint robot (an articulated robot) having a manipulator of a multi-joint in order to have a proper form to perform various tasks. Further, some example embodiments provide new learning models for a robot to safely perform various and complicated tasks, by providing a new type of learning method of a multi-joint robot.

In some example embodiments of the present invention, new learning methods of a robot are explained on the basis of structures of a driving unit having a multi-joint and an interface device. However, example embodiments are not limited to this. That is, some example embodiments to be explained hereinafter may be applicable to any type of structure or learning method of a robot.

Figure 1B:
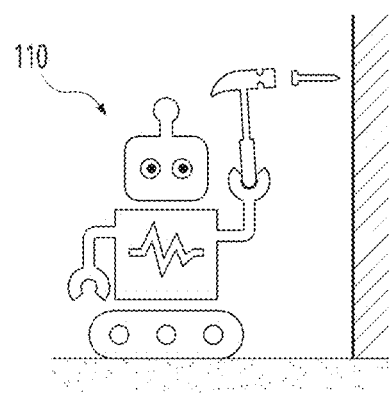

FIGS. 1A and 1B are conceptual views for explaining a method for learning a robot task and a task execution according to an example embodiment.

As shown in FIG. 1A, a user teaches a task desired in a specific operation environment, to a robot.

Here, the operation environment is an environment for the robot to perform an operation, and may include various environmental factors around the robot. Especially, the operation environment may be understood as including materials related to an operation to be performed by the robot, tools, an operation target, etc.

Hereinafter, some example embodiments will be explained by taking a specific task and a specific task environment as a concrete example.

For instance, as the specific task, "driving (hammering) a nail into a tree" will be defined.

In the present disclosure, a user may teach a robot an operation to drive (hammer) a nail into a tree, in order to perform a specific task. The user may be a specialist for a task or a specialist for teaching of the robot, and may remotely control the robot by using an interface device. The "user" referred in this disclosure is not limited to a specialist, but may be any subject which can control a robot by using an interface device.

In this disclosure, the "teaching" means leading a robot by teaching and may be replaced by instructing, guiding, etc.

The interface device may generate a driving command and transfer the driving command to the robot, according to a user's manipulation. For instance, the interface device transfers the driving command to a remote controller through a communication with the robot.

As shown, the robot performs a task to drive a nail into a tree according to a user's manipulation. In this case, a task operation environment (or a specific task environment) may be an object such as the tree, a position of the tree, a material of the tree, a restriction on a posture of the robot, etc.

The present disclosure proposes methods to learn a task using force information by a robot which can control a force, by using a haptic device as an interface device.

Thus, the interface device is configured to output a force generated when the robot hammers a nail as a haptic feedback. For this, the interface device may be provided with a haptic module.

The user teaches an operation to drive a nail (a nailing operation) to the robot in a remote control manner, with substantially feeling a force generated from the robot at the time of the operation. For example, the robot performs a substantial or an actual task in a demonstrating manner. Here, the user feels a force generated from the corresponding task through the interface device, and manipulates the interface device for the demonstration.

According to some example embodiments, the robot senses learning data from the teaching of the task, and may establish database including the sensed learning data. The robot may learn the task through a machine learning by using the established database.

A controller, or a control program or a task execution policy, etc. are derived through the learning. And the robot autonomously performs a task which was previously performed and a task similar to the past task, by utilizing the learning result, even when there is no teaching by the user.

As shown in FIG. 1B, as a result of the learning, the robot may perform a task to drive a nail into a concrete wall. The task to drive a nail into a concrete wall has different environments in that the object is arranged vertically unlike the tree which is arranged horizontally, a larger force is desired to drive a nail, etc. However, the robot may autonomously perform the corresponding task even when the task environment changes, because it understood the user's behavior intention under teaching of the task.

However, example embodiments of the present disclosure are not limited to the same type of processes as those in this example embodiment. It will be obvious to those skilled in the art that example embodiments may be implemented in another form. For instance, in a teaching step, teaching of a task to drive a nail into a tree which is arranged vertically may be performed. In case that the robot is requested to drive a nail into concrete not a tree, an object, a target of the task is changed into the concrete from the tree, which means that the task environment is changed. In response to the change in the task environment, the robot according to an example embodiment may derive task information desired in the changed task environment from the previously learned task information (e.g., force information), for the task in the changed task environment. For instance, in case of driving a nail into concrete, a larger force is desired than in the case to drive a nail into a tree. And the robot of the present invention may derive force information required for the new task, based on learning.

For implementation of the method to learn a robot task and the task execution aforementioned with reference to FIGS. 1A and 1B, the present disclosure provides a new definition of a robot task, and methods to learn various tasks by a robot.

Figure 2:
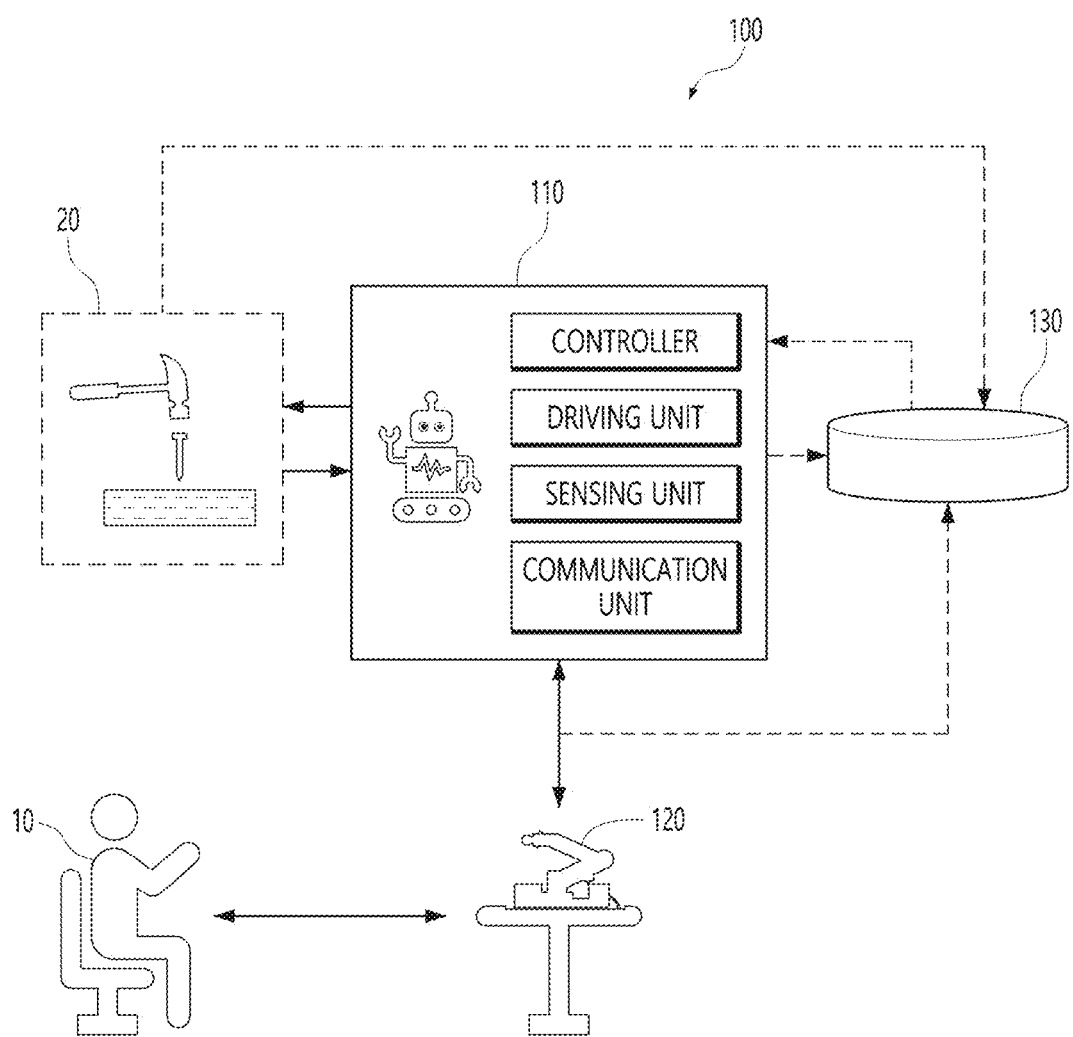
FIG. 2 is a conceptual view for explaining an overview of a robot system according to an example embodiment.
Figure 3:
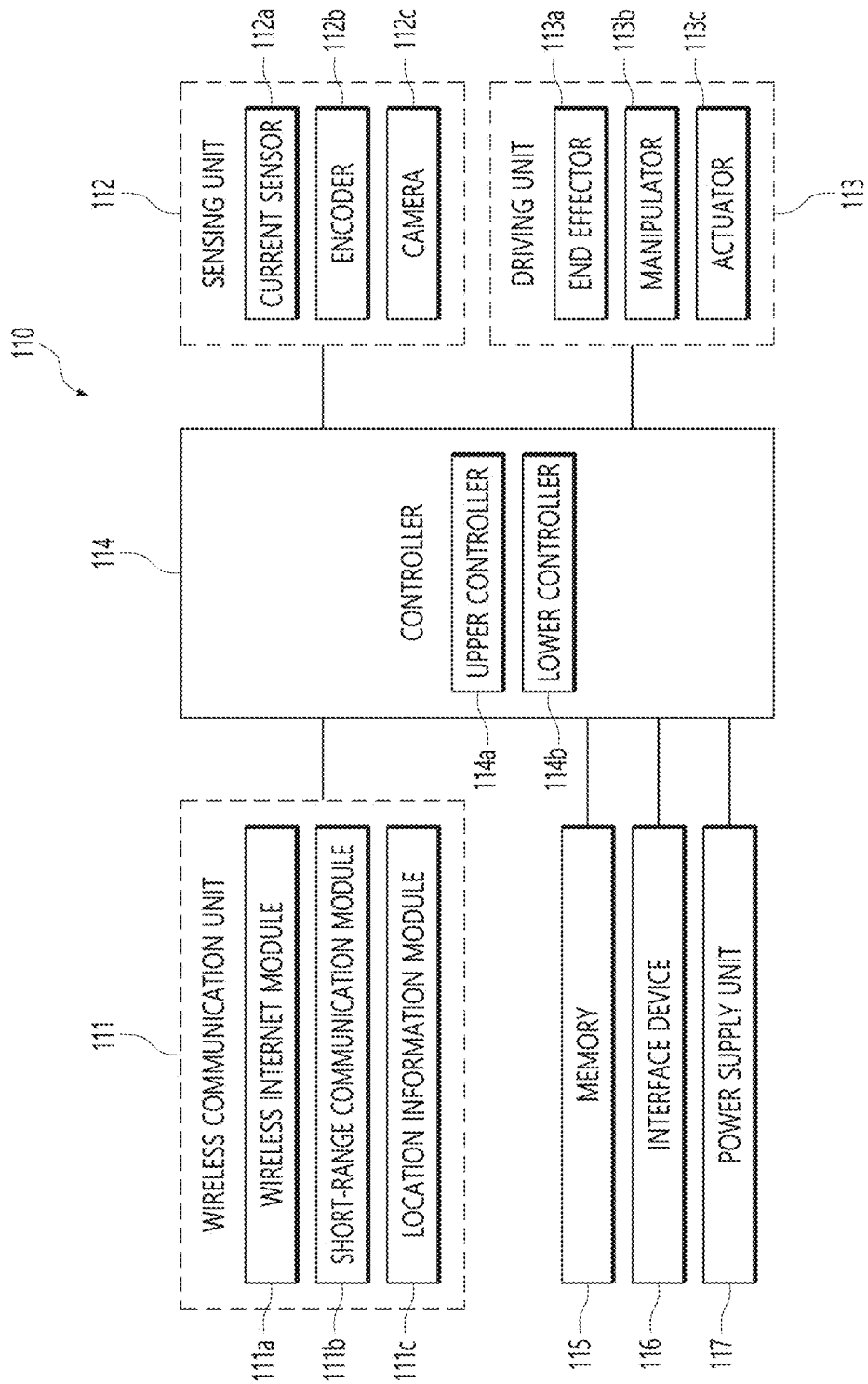
FIG. 3 is a block diagram for explaining a structure of a robot device of FIG. 2.

Like this, the present disclosure provides a new definition of a robot task, and a methodology to learn various tasks. Hereinafter, methods to learn a robot task and/or robot systems according to the present disclosure will be explained in more detail with reference to the attached drawings. FIG. 2 is a conceptual view for explaining an overview of a robot system according to an example embodiment. FIG. 3 is a block diagram for explaining a structure of a robot device of FIG. 2. And FIG. 4 is a flowchart for representatively showing a method for learning a robot task according to an example embodiment.

In the following descriptions, "a system to make a single robot learn and a learning method" are explained as examples. However, the present disclosure may be also applicable to a system to make a plurality of robots learn and a learning method.

Referring to FIG. 2, a robot system 100 according to an example embodiment may include at least a robot device (interchangeably, referred to as "robot") 110, an interface device (interchangeably, referred to as "haptic remote controller" or "haptic controller") 120 and a database 130. And the robot system is combined with a user 10 and a task environment 20 to thus implement a learning method of FIG. 4.

Figure 4:
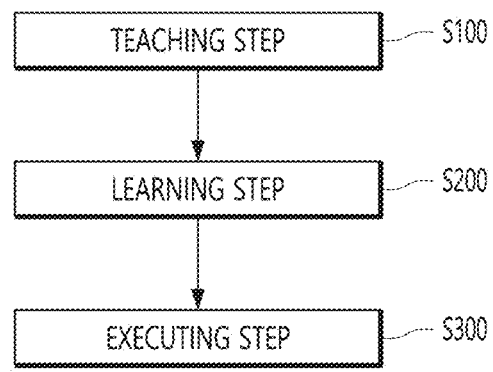
FIG. 4 is a flowchart for representatively showing a method for learning a robot task according to an example embodiment.

Referring to FIG. 4, the learning method according to an example embodiment may include a teaching step (S100), a learning step (S200), and an executing step (S300).

In the teaching step (S100), the user may teach the robot device 110 while performing a task by manipulating the robot device 110 through the interface device 120.

Referring to FIG. 2, in the teaching step (S100), the user 10 may perform a task by manipulating the robot device 110 through the interface device 120 having a haptic function. As aforementioned, the user may be a specialist of a task, or a specialist of robot teaching.

The task environment 20 means an environment including an object for a task, which may be indicated to include an object, a tool or surrounding circumstances. For instance, in a case that a home-delivery product is transferred to a recipient in a building, the task environment 20 may include a delivery product (object), a storage box (tool) at the time of a delivery, and a place (a surrounding environment) such as inside and outside a building, a passage (a hallway), stairs and an elevator. As another example, in case of driving a nail into a tree as aforementioned, the task environment 20 may include the tree, the nail (the object), a tool (a hammer), and the surrounding environment where the tree is arranged.

In this case, the robot device 110 may be included in the task environment 20 as itself. For instance, a size of the robot device 110, a moving range, etc. may be the task environment 20.

In this example embodiment, the task may be defined as an operation to implement a specific object or a target in a desired state (a position, a posture, etc.). For instance, in case of carrying a home-delivery product to a recipient in a building, the task may be an operation to carry the delivery product to a desired position and to transfer to the recipient. As another example, in case of driving a nail into a tree as aforementioned, the task may be an operation to apply a force to the nail in a vertical direction, and to drive the nail into the tree which is arranged on the floor in a horizontal direction.

The interface device 120 may be a haptic remote controller as a learning/teaching device. For instance, the interface device 120 may be a device used when the user performs a task by manipulating the robot device 110, and configured to provide a haptic feedback such that the user 10 recognizes a reciprocal operation between the robot and the task environment occurring during the task.

For this, the interface device 120 is configured to be manipulatable for teaching the robot device 110, and is configured to output a haptic feedback based on the force information while teaching the task to the robot device 110.

As such an example, the interface device 120 may be a device having more than 6 degrees of freedom, and each degree of freedom may be a moving structure by an actuator. In addition to such a configuration for manipulation, the interface device 120 is further provided with a device to receive a haptic feedback.

For instance, the interface device 120 may be provided with a haptic module to output a haptic feedback. Also, the haptic module may be provided in two or more in number according to a combination of haptic functions of the interface device 120.

The interface device 120 may be provided with a wireless communication unit for communications with the robot device 110, and an output unit for receiving information from the robot and transferring to the user.

The wireless communication unit may be configured as modules for wireless communications with the robot device 110, and the output unit may be a display device for outputting image information received from the robot device, etc. In this case, the display device may be a 3D display, a mixed reality display, a VR device, etc.

The robot device 110 is configured to perform a task, and to detect force information related to the task.

The robot device 110 may be one of the various types of robots aforementioned with reference to FIG. 1. The robot device 110 includes a device (a driving unit of the robot) for changing a task environment, and may be provided with a device (a sensor, etc.) for recognizing the task environment.

As such an example, referring to FIG. 3, the robot device 110 may include a wireless communication unit (or interchangeably refer to as "wireless communication circuit") 111, a sensing unit (or interchangeably refer to as "sensor") 112, a driving unit (or interchangeably refer to as "driver") 113, a controller 114, a memory 115, an interface unit 116, a power supply unit (or interchangeably refer to as "power supply") 117, etc. However, the robot device 110 of this disclosure may have greater or fewer components than the above components. For instance, the sensing unit 112 and the controller 114 may exist inside or outside the robot device 110. That is, it is possible that one part of the wireless communication unit 111, the sensing unit 112, the driving unit 113, the controller 114, the memory 115, the interface unit 116, or the power supply unit 117 is configured as the robot device 110, and another part is implemented as an additional device. It is also possible that the wireless communication unit 111 is replaced by a wired communication unit, and the robot device and the interface device are provided with an additional wired communication unit. In this case, the robot device and the interface device may include a wired communication units as well as a wireless communication units in a single system.

The wireless communication unit 111 is configured to perform wireless communications between the robot device 110 and the interface device 120, between the robot device 110 and another robot device, or between the robot device 110 and an external server. Further, the wireless communication unit 111 may include one or more modules which connect the robot device 110 to one or more networks. To facilitate such communications, the wireless communication unit 111 may include a wireless Internet module 111a, a short-range communication module 111b, a location information module 111c, etc.

The wireless Internet module 111a is a module for wireless internet access, and may be internally or externally coupled to the robot device. The wireless Internet module 111a is configured to transmit and/or receive wireless signals via communication networks according to wireless Internet technologies.

The short-range communication module 111b is a module to perform short-range communications, and may support short-range communications of the robot device. Suitable technologies for implementing such short-range communications may include at least one of BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 111c is a module for obtaining a position (or a current position) of the robot device 110, and may be at least one of a Global Position System (GPS) module and a Wi-Fi module. The location information module 111c may obtain position information by being combined with the sensing unit 112. In this case, the location information module 111c may be configured to receive information desired in an optical sensor module, a lidar module, an inertia sensor module, an image module and a fusion sensor module.

The sensing unit 112 may include one or more sensors for sensing at least one of force information generated from a task, internal information of the robot device (especially, a driving state of the robot), peripheral environment information around the robot device, position information of the robot device, and user information.

The force information generated from the task may be an external force applied to the robot device 110, for instance. In this case, the external force may be measured by using a force-torque sensor, or may be calculated through an estimation using a state of the robot such as a current applied to a motor, etc.

The driving state of the robot may be an angle of the motor, an acceleration, an angular speed, a torque or a current applied to the motor, etc. Thus, the sensing unit 112 may be provided with a current sensor 112a for sensing a current applied to the motor, and an encoder 112b for sensing an angle of the motor. Further, the sensing unit 112 may be provided with an inertial measurement unit (IMU) sensor for sensing an acceleration and an angular speed, a torque sensor for sensing a torque applied to the motor, etc.

Surrounding environment information of the robot device 110 may include the task environment 20. For this, the sensing unit 112 may measure data such as a distance from an object and a temperature of the task environment, by using specific sensors. Further, the sensing unit 112 may be provided with a camera 112c in order to obtain information by using a vision processing. Like this, the sensors for sensing the task environment 20 may be provided inside or outside the robot device 110. For instance, in case of capturing a surrounding situation with the robot device 110, the sensors may be provide outside the robot device.

As another example, an image sensor, a camera, etc. may be additionally provided outside the robot device 110 at the robot system 100, in order to obtain information in the teaching step (S100) regardless of the configuration of the sensing unit 112.

The driving unit 113 is configured to perform a driving according to a teaching command of the user under control of the controller 114. For instance, the driving unit 113 may be provided with at least one of an end effector 113a, a manipulator 113b and an actuator 113c.

The end effector 113a is an end device of a robot arm designed to reciprocally operate with the environments, which may be a gripper, a pincette, a knife, etc. It is also possible that the end effector 113a is separately provided from the robot device 110 to thus serve as a peripheral device of the robot, an accessory, etc.

The manipulator 113b may be a device to integrate links, joints, other structural factors and a mechanism to a body and arms of the robot device. In case of a multi-joint robot, the manipulator 113b may be provided to have a plurality of joints which perform a rotary motion of the motor.

In this case, the manipulator 113b and the end effector 113a may form arms more than 6 degrees of freedom, and hands more than 1 degree of freedom. And the arms and the hands may exist as a plurality of pairs such that the robot according to an example embodiment is implemented as a robot having two arms or a plurality of arms.

Further, the actuator 113c is a device to convert electric, chemical or thermal energy into a rotary or linear motion, and may be a motor, a pneumatic cylinder, artificial muscles, etc.

The actuator 113c may be provided with a motor driven in a Quasi-Direct-Drive (QDD) manner. In the QDD manner, a force applied to an output terminal can be detected by a sensor of an input terminal.

In this case, the sensor of the input end may be included in the sensing unit 112. That is, the sensing unit 112 may detect the force information by sensing a force applied to the output end of the motor as electric energy of the input end.

Like this, an external force may be detected by the current sensor of the motor driven in the QDD manner, or a torque may be predicted by controlling a current of the motor. An external force generated from a robot task may be calculated through an estimation using a state of the robot, such as a current applied to the motor. However, example embodiments of the present disclosure are not limited to this. For instance, it is possible to control a torque by utilizing a torque measuring sensor to joints together with the motor, rather than in the QDD manner.

The robot device 110 according to an example embodiment may include a memory 115, an interface unit 116 and a power supply unit 117.

The memory 115 may store programs to support operations of the controller 114 and temporarily store input/output data (for example, a driving command). The interface unit 116 may serve as a passage to connect the robot device 110 with an external device. For instance, the interface unit 116 may be a connection port, a port, a power source terminal, etc. The power supply unit 117 may be a device to receive external power and internal power and to supply the power to the respective components included in the robot device 110. In some example embodiments, the power supply unit 117 may be a device to generate electric energy in the robot device 110 and to supply the electric energy to each component.

The controller 114 controls an operation to perform a task, and an overall operation of the robot device 110.

Referring to FIG. 3, the controller 114 may be provided with a first controller and a second controller.

In this example embodiment, the first controller may be a lower controller 114b, and the second controller may be an upper controller 114a. However, example embodiments of the present disclosure are not limited to this. For instance, the first controller may be the upper controller, and the second controller may be the lower controller. As another example, it is also possible that the first and second controllers are configured in parallel, not as the upper and lower controllers.

The controller 114 (e.g., the lower controller 114v and the upper controller 114a) may be implemented as processing circuitry such as hardware including logic circuits or a hardware/software combination such as a processor executing software. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, or application-specific integrated circuit (ASIC).

The lower controller 114b may be configured as one or more controllers. For instance, the lower controller 114b may include at least one of a position controller, a speed controller or a current controller. In this case, the driving unit 113 performs a driving according to a teaching command of the user under control of the lower controller 114b.

For instance, the lower controller 114b controls the driving unit 113 by receiving a teaching command of the task from the interface device 120. In some example embodiments, the lower controller 114b may control the driving unit 113 by receiving a driving command for the task from the upper controller 114a. In this case, the upper controller 114a may be a controller for driving the driving unit 113 by controlling the lower controller 114b, and detailed descriptions thereof will be explained later.

In some example embodiments, the lower controller 114b may receive a command from the interface device 120 or the upper controller 114a, and may calculate a torque or a current to be applied to the motor by using sensing data. Based on the calculated result, the motor, etc. may be driven by a position controller, a speed controller, a current controller, etc. And a driving command may be determined by one or more parameters.

In this case, the driving command does not contain task information. That is, the lower controller 114b performs a command to move a specific motor to a specific position, to apply a specific amount of current to a specific motor, etc.

In conclusion, the lower controller 114b is a controller which performs a reciprocal operation between an external environment and a robot through the motor, and controls the actuator 113c such as the motor based on a command received from the upper controller 114a or the interface device 120. Thus, in the teaching step (S100), the lower controller 114b receives a driving command from the interface device 120 to thus control the actuator 113c such as the motor.

Referring to FIG. 2 back, the robot system 100 according to an example embodiment may include database 130. The database 130 may sense a state of the robot and task environment information, and may detect a command transmitted to the lower controller 114b from the interface device 120 to thus store as time series data.

The database 130 may store not only information in the teaching step (S100), but also past data. For instance, a policy (a methodology) derived from past learning may be stored together.

In the learning step (S200) of FIG. 4, a learning unit 140 ((or interchangeably refer to as "computer") (refer to FIG. 6B) may perform a learning by using the database 130. And at least a part of the upper controller 114a may be derived as a result in the learning step (S200). For this, the robot system 100 may further include the learning unit 140. The learning unit 140 may be a computer (e.g., a server) including a memory and at least one processor.

The learning unit 140 learns a motion (or an operation) of the robot device 110 related to the task, by using the database 130, such that the robot device 110 autonomously performs the task. For instance, the learning unit 140 may be separately configured from the robot device 110, or may be provided in the robot device 110. It is also possible that the learning unit 140 is provided at an additional server together with the database 130.

The learning step (S200) may be a step of storing information generated in the teaching step (S100) (sensing data and an internal state of the robot) at the database 130, and of deriving a policy (e.g., the upper controller) for performing a corresponding task through a learning using the stored data.

Here, an objective function to derive the upper controller may be a condition that a task performed as the user manipulates the robot through the interface device and a task performed by using the learned upper controller have the same result.

In this case, the learning step (S200) is not necessary performed after the teaching step (S100). According to some example embodiments, the teaching step (S100) is performed prior to the learning step (S200). However, according to some other example embodiments, the teaching step (S100) may be performed such that at least a part thereof overlaps the learning step (S200) on the basis of a time flow.

Referring to FIG. 3, the upper controller 114a may be provided at the controller 114 of the robot device 110. Also, the upper controller 114a may be divided into a plurality of controllers, and may be transformed into various types. For instance, the upper controller 114b may be implemented as one of systems used in an artificial intelligence (AI) technology.

As such an example, the upper controller 114a may be provided with at least one of a hierarchical controller, a finite state machine, or a behavior tree. The upper controller may be implemented by a programming language such as Gen, Python, Lisp-language, Julia and C/C++, and by AI deep learning framework (TensorFlow), Pytorch, Theano, etc. In this case, the upper controller 114a may be provided with a part learned from data as a result in the learning step (S200), and a pre-programmed part regardless of a learning, respectively.

In the executing step (S300) of FIG. 4, the upper controller 114a may receive a type of a task to be performed, calculate information about a next behavior from the current state information, and transmit to the lower controller 114b. Like this, the robot device 110 autonomously performs a task in the executing step (S300) by using a learned policy or the derived upper controller 114a.

The upper controller 114a transmits a command to the lower controller 114b in one direction, as a result in the learning step (S200). Thus, a period of the upper controller 114a and a period of the lower controller 114b may be differently set.

In this case, the upper controller 114a contains information related to a task, and may be expressed as a series of sequences for performing a motion. As such an example, the upper controller 114a may be expressed as follows.

$$u_t = f(\text{task}, x_{t:1}, u_{t-1:1})$$

x: Data obtained from a sensor (a state of the robot and a task environment)
u: Behavior (a command in the aspect of the lower controller)
$x_{t:1}$: A state from 1 second to t seconds Here, the behavior may be a posture of the end effector of the robot device, or a torque (or a current) of the motor. In some example embodiments, the behavior may be a state-torque function expressed as a vector field, or may be a subset of a parameter set which constitutes the lower controller.

According to some example embodiments, as the interface device 120 having a haptic function is used, an expert has feedback from a force applied to the robot in a substantial or actual operation environment, and performs teaching of the robot. And as a plurality of information sensed through the teaching of the robot is learned, the upper controller 114a is derived. This may implement a methodology to make the robot which can control a force learn force information associate with a task, by using a haptic device.

Figure 5A:
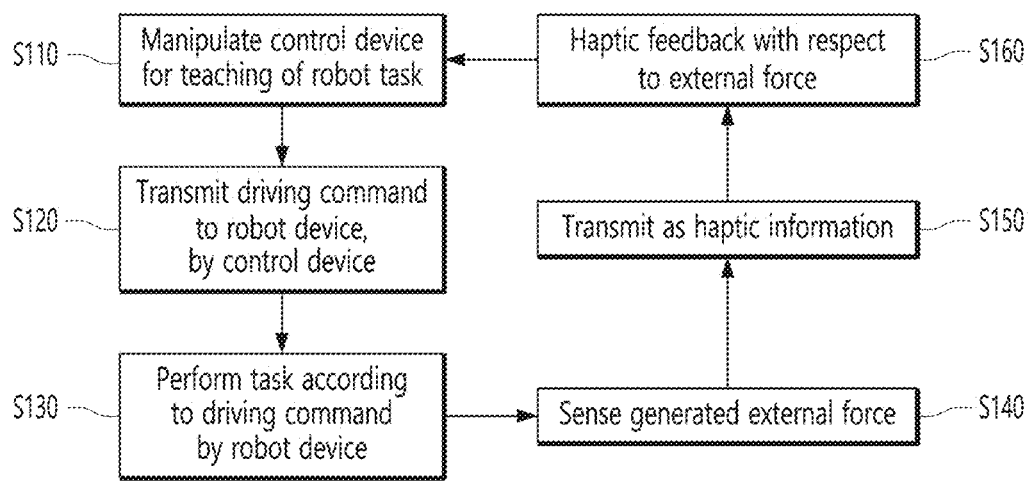
FIGS. 5A and 5B are a detailed flowchart of a teaching step of FIG. 4, and a conceptual view for explaining a concept of teaching, respectively.
Figure 5B:
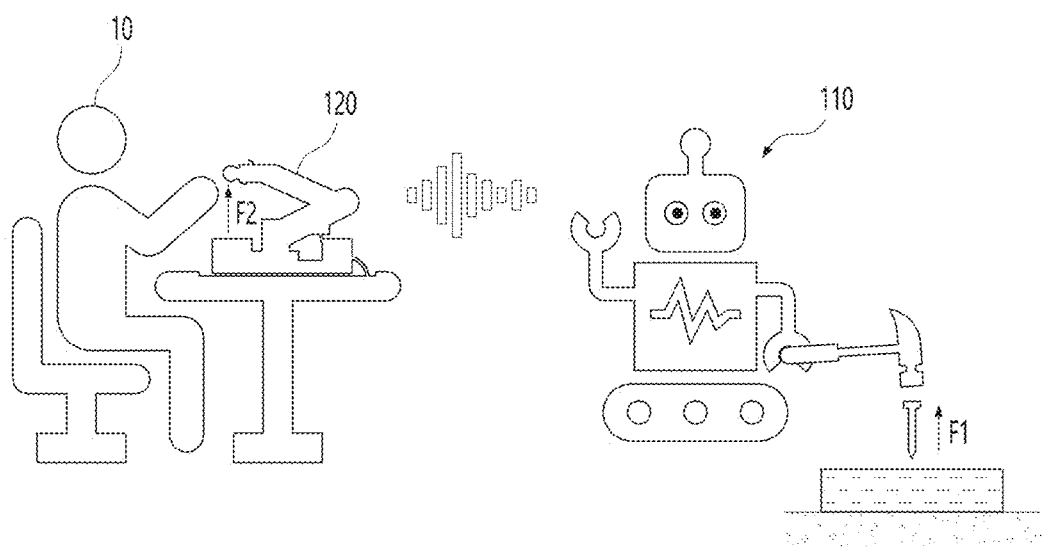
Figure 6A:
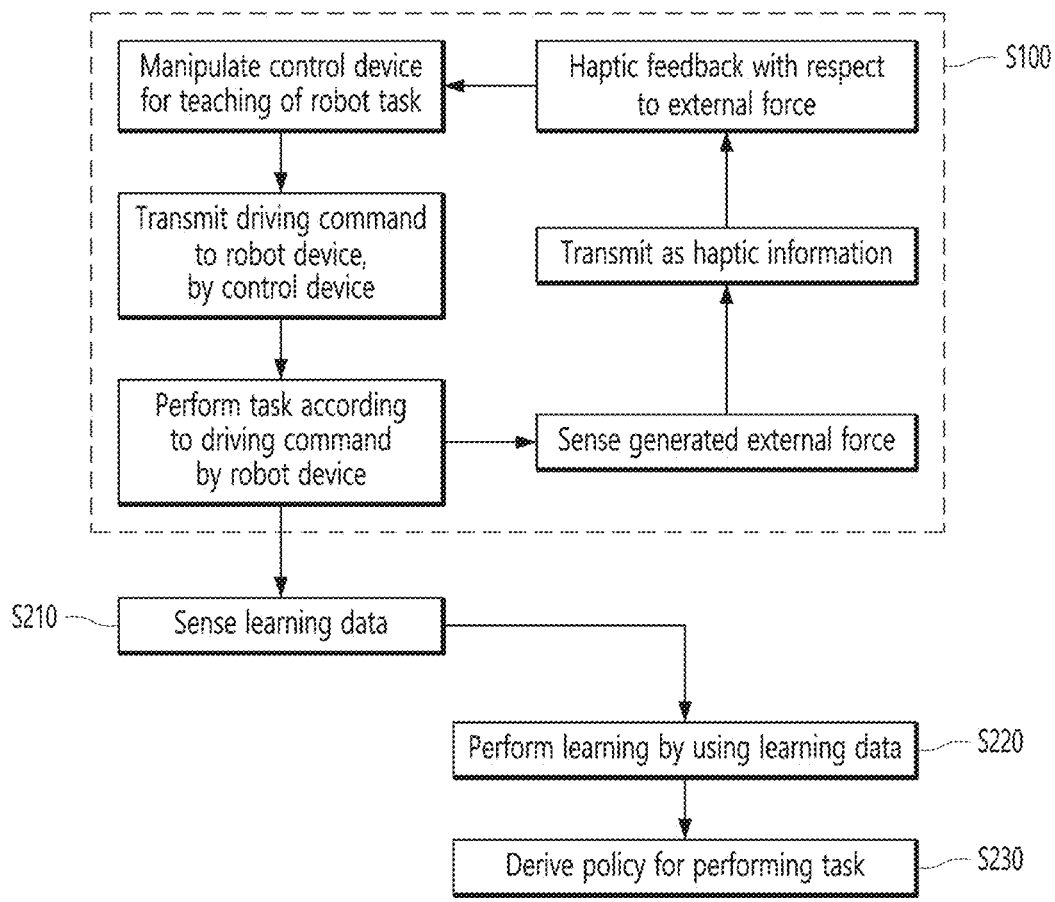
FIGS. 6A and 6B are a detailed flowchart of a learning step of FIG. 4, and a conceptual view for explaining a concept of learning, respectively.
Figure 6B:
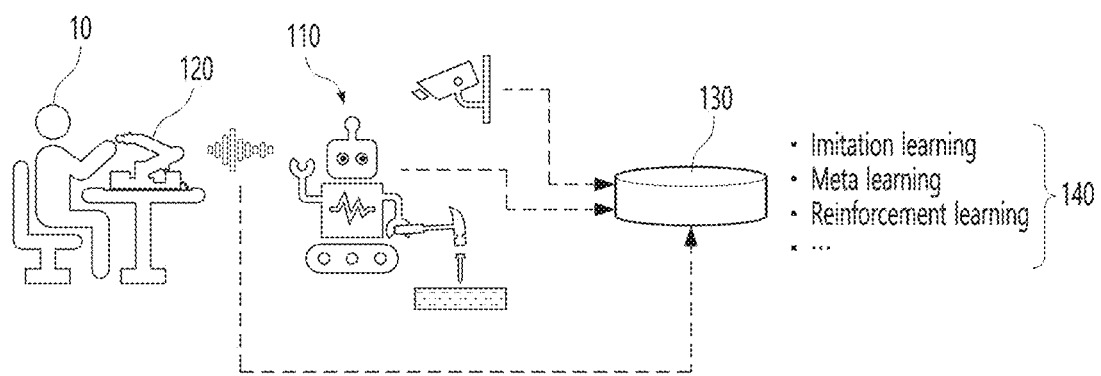
Figure 7A:
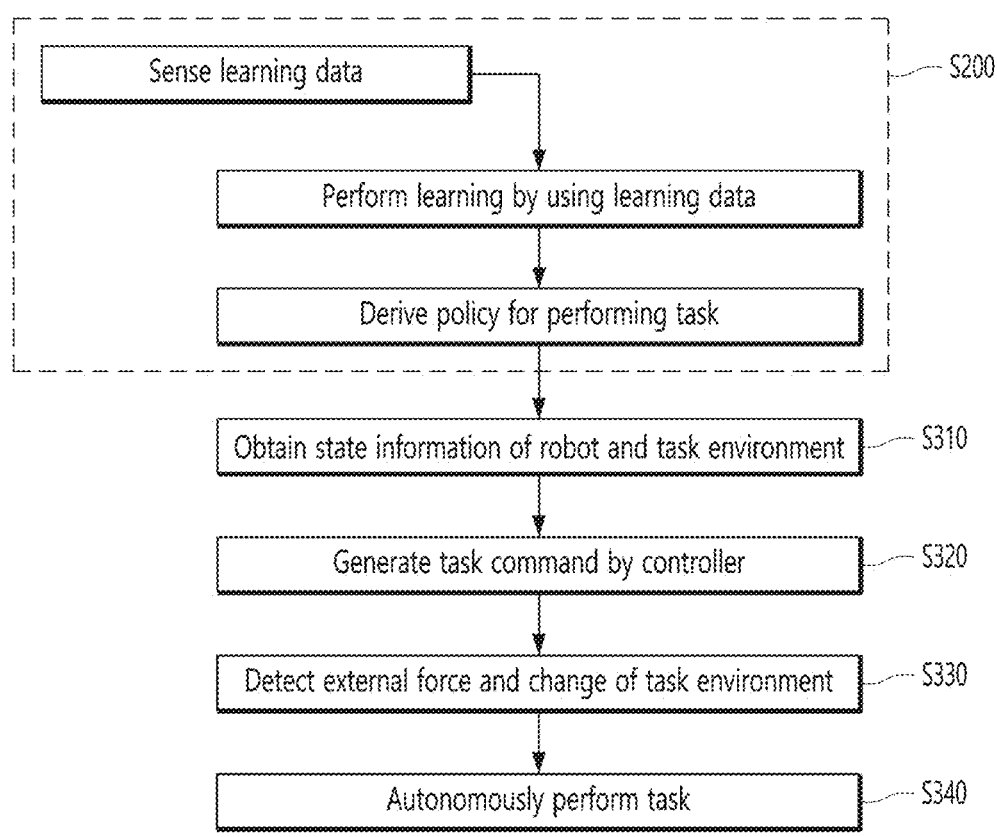
FIGS. 7A and 7B are a detailed flowchart of an executing step of FIG. 4, and a conceptual view for explaining a concept of execution, respectively.
Figure 7B:
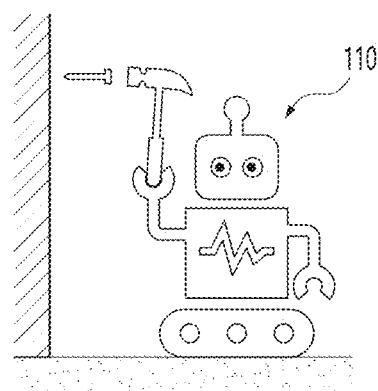

Hereinafter, a method to learn a robot task will be explained in more detail with reference to the attached drawings, by referring to the aforementioned robot system 100 of the present invention. FIGS. 5A and 5B are a detailed flowchart of the teaching step of FIG. 4, and a conceptual view for explaining a concept of teaching, respectively. FIGS. 6A and 6B are a detailed flowchart of the learning step of FIG. 4, and a conceptual view for explaining a concept of learning, respectively. And FIGS. 7A and 7B are a detailed flowchart of the executing step of FIG. 4, and a conceptual view for explaining a concept of execution, respectively.

The method to learn a robot task according to an example embodiment may be categorized into details as shown in FIG. 5A.

Firstly, teaching of a robot task is performed based on an external manipulation of the interface device 120. That is, a manipulating device is controlled for teaching of a robot task by an expert (S110). The expert may be implemented variously, such as a user, an expert of a task, an expert of robot teaching or an operator, and will be referred to as an expert for convenience of explanations.

In this case, advance preparations for robot teaching by the expert may be performed. For instance, once a robot task is determined, a detailed task environment setting or a teaching plan setting for teaching the robot and making the robot learn, etc. may be performed.

As shown in FIG. 5B, the interface device 120 may be configured as multi joints in a similar size to human arms or robot arms. In some example embodiments, the interface device may be provided with the function or structure aforementioned with reference to FIGS. 1 to 4.

Next, when the expert manipulates the interface device 120 by movement in a grasping manner, a driving command is generated from the interface device 120 and is transmitted to the robot device 110 (S120). That is, the interface device 120 transmits a driving command corresponding to the manipulation, to the robot device 110. However, example embodiments of the present disclosure are not limited to this. That is, it may be also possible that the interface device 120 transmits information about the movement to the robot device 110, and the robot device 110 generates a driving command.

For example, the information about the movement may be transmitted to the robot device 110, through a data communication using the interface device 120 and the wireless communication unit of the robot device 110. Next, the information about the movement is transmitted to the lower controller 114*b* (refer to FIGS. 2 and 3) of the robot device 110. In this case, a controller or an algorithm based on kinematics information of the interface device 120 and the robot device 110 may be provided in order to describe the expert's manipulation or movement by the robot device 110.

Then, the robot device performs a task according to a driving command (S130). For example, once a command for performing an operation is input to the lower controller 114*b* of the robot device 110, the lower controller 114*b* performs a task by controlling the driving unit 113 of the robot device 110. For instance, the sensing unit 112 of the robot device 110 senses a task environment, a current state of the motor, etc. And the lower controller 114*b* receives the task environment or the current state of the motor from the sensing unit 112 to thus calculate an operation for performing a task, thereby controlling the motor in correspondence thereto. In this case, the motor may be the QDD type of motor aforementioned with reference to FIGS. 1 to 4, or other type of motor.

Like this, once hardware components (e.g., the end effector 113*a* (refer to FIG. 3) and the manipulator 113*b* (refer to FIG. 3)) move through the motor, a task environment is changed though a reciprocal operation with a force. Such a change of the task environment may be a change of a protruded height of a nail from a tree at the time of hammering the nail into the tree, for instance. Detailed descriptions thereof will be replaced by the aforementioned ones. Here, sensors of the sensing unit 112 sense a generated external force (S140). Further, the sensing unit 112 may sense a state or a change of the task operation.

Next, the interface device 120 receives information about a force generated from the robot task from the robot device 110, thereby outputting a haptic feedback.

Like this, while the expert's teaching is performed by the interface device 120, the sensing unit 112 detects an external force applied to the robot device 110, and the interface device 120 outputs the haptic feedback based on the external force.

For example, information about an external force or a state or a change of a task environment, inputted from the sensor, is transmitted to the expert through the interface device 120. First of all, the information may be transmitted to the interface device 120 as haptic information (S150). The haptic information may be data informing the external force or the state or the change of the task environment. In this case, the lower controller 114*b* may transmit the force information to the interface device 120 as haptic information.

For instance, referring to FIG. 5B, if the robot device hits a nail with a hammer in order to drive the nail into a tree, a reaction force (F1) is generated and applied to the robot. Data of the reaction force (F1) may be transmitted to the interface device as force information. The interface device applies a force (F2) corresponding to the reaction force (F1) to its part grasped by the expert's hand in a vertical direction, such that the expert feels the reaction force (F1) at the time of the nailing task. In this example embodiment, the reaction force is explained as an example. However, in the task environment, various types of external forces, a material of an object, a rough degree (roughness) of a surface, a weight of the hammer, etc. may be generated. And such external forces may be included in the force information.

Like this, the interface device 120 transmits a force corresponding to the external force to the user by the haptic feedback, in order to teach the robot device 110 based on the force information.

A driving command to drive the haptic module for the haptic feedback is generated from the interface device 120. As another example, the haptic information may be a control command with respect to the interface device 120, derived from the data. In this case, the haptic module is driven by using the control command.

As the haptic module is driven, the interface device 120 outputs a haptic feedback with respect to the external force (S160). For instance, the haptic module may be provided with a plurality of actuators or devices. And the interface device 120 may transmit data on a force or an environment change through the actuators or the devices such that the expert feels.

Like this, the expert who has received the haptic feedback controls the manipulating device for teaching the robot task, by reflecting the force (S110).

The expert may receive information for teaching from the interface device 120, or may feel by directly viewing a task environment. Here, a reciprocal operation with the task environment is performed only through the robot. That is, an environment change can be performed only through the robot device.

After the aforementioned teaching step (S100), the learning step (S200) of FIG. 4 is performed. In the method to learn a robot task according to an example embodiments, the learning step (S200) may be categorized into details as shown in FIG. 6A.

Referring to FIG. 6A, the learning step (S200) may include a data storing step and a policy (a methodology) learning step.

First of all, once the robot device 110 performs a task according to a driving command in the teaching step (S100), learning data is sensed (S210). For example, while the robot device 110 performs the robot task according to a driving command transferred to the robot device 110 by the interface device 120, first information related to a task environment of the robot device 110, and second information related to a driving state of the robot device 110 may be sensed.

The sensing of the first and second information is performed by the sensing unit 112, while teaching of the task to the robot device is performed by the interface device 120 which outputs a haptic feedback. The learning data does not necessarily include both the first and second information, but may include one of the first and second information.

The sensed first and second information may be collected as data to check the expert's behavior intention. The first and second information may be information that the task environment and the driving state are changed according to teaching of the task to the robot device 110 based on the force information. In other words, both the first information relating to the task environment of the robot and the second information relating to the driving state of the robot changes according to teaching of the task to the robot based on the force information. Here, the behavior intention means a plan for a task performed by doing a specific operation at a specific situation. And the behavior intention may be embodied by the upper controller 114a derived through a learning.

Referring to FIG. 2 together with FIG. 6B, if the expert moves the robot device 110 by using the interface device 120 and the robot device 110 performs a task, a driving command transferred to the robot device 110 may be stored in the database 130. Also, the task environment 20 and a driving state of the robot device 110 may be stored in the database 130. Here, the descriptions explained with reference to FIGS. 1 to 4 may be applied to the task environment 20 and the driving state. As an example, the first information may include at least one of a capturing image, a distance from an object or a temperature of the task environment. And the second information may include at least one of an angle of the motor, an acceleration, an angular speed, or a torque or a current applied to the motor.

As shown in FIG. 6B, the capturing image may be obtained by a camera provided separately from the robot device 110, etc. As another example, the temperature of the task environment may be obtained by a temperature measuring device (not shown) provided separately from the robot device 110.

After the aforementioned data storing step, a policy learning step is performed. The data storing step and the policy learning step may be sequentially performed, but example embodiments are not limited to this. For instance, it is also possible that the policy learning step is performed while the data storing step is performed.

For example, a step of learning the robot task by using the first and second information is performed. That is, at least a part of the controller 114 (refer to FIG. 3) of the robot device 110 is derived through a learning of the robot task.

For example, the learning unit 140 learns a motion (or operation) of the robot device 110 related to the task, based on the first and second information, such that the robot device 110 autonomously performs the task. For instance, as the learning unit 140 performs learning of the task, at least a part of the upper controller 114a may be derived. In this case, the first information and the second information are stored in the database 130 as time series data together with the teaching command, and the learning unit 140 derives the upper controller 114a by using the time series data.

This step may be a process of deriving the upper controller 114a such that a task performed by the expert is performed only by the upper controller 114a without the expert. In this case, it is possible that a part of the upper controller 114a is derived. The upper controller 114a may be divided into a first controller and a second controller. The first controller is a preset part to drive the robot device, which may be a part pre-programmed regardless of the learning. The second controller may be a part derived from the learning and configured to interwork with the first controller. That is, the second controller may be a part derived from data as a result in the learning step.

In the learning step (S200), learning is performed by using the obtained learning data (S220), and a policy to perform a task is derived through the learning (S230). Here, the learning may be performed by using not only recent data, but also past information. For this, a policy (a methodology) derived from past data or past learning may be stored together in the database 130.

The learning may be performed by various algorithms, and may be performed by at least one of an imitation learning, a meta learning, a reinforcement learning or an inverse reinforcement learning, for instance.

Then, the upper controller 114a generates a control command with respect to the lower controller 114b such that the robot device 110 autonomously performs the task based on the learning.

For instance, after at least a part of the controller 114 of the robot device 110 is derived through the aforementioned learning of the robot task, the robot device 110 autonomously performs the task through the controller 114.

That is, after the aforementioned learning step (S200), the executing step (S300) of FIG. 4 is performed. In the method to learn a robot task according to an example embodiment, the executing step (S300) may be categorized into details as shown in FIG. 7A.

For example, in the executing step (S300), the robot device 110 performs a task which has been performed by the expert, by using the upper controller 114a obtained in the learning step (S200), without the expert. For example, even when a task environment in the executing step (S300) is different from that in the teaching step (S100), the robot device 110 may perform the task because it understand the expert's behavior intention. As one example, if the expert teaches a task to drive a nail into a tree which is put on a floor as shown in FIG. 5B, the robot device 110 may autonomously perform a task to drive a nail into a concrete wall as shown in FIG. 7B.

As another example, if the expert teaches a task to carry a delivery product by lifting above the head of the robot device for safety, the robot device may carry a heavier delivery product by lifting above its head with a larger force. Hereinafter, the executing step (S300) will be explained in more detail.

First of all, a task to be performed by the upper controller 114a obtained in the learning step (S200) is set. Such a setting can be performed in any form which discerns a task. For instance, natural numbers may be set to corresponding tasks, respectively. For example, 1 may be a task to drive a nail, and 2 may be a task to carry a delivery product. In this case, if 1 is set, the robot device recognizes a command to perform a task to drive a nail.

Next, the upper controller 114*a* transmits an operation command to be performed to the lower controller 114*b*, by using current state information of the robot device and a task environment. For instance, the robot device 110 obtains state information of the robot device and state information of a task environment (S310), and the controllers generate a task command by using such information (S320). For example, if 1 is set and a command to drive a nail is recognized, the robot device 110 recognizes a concrete wall as state information of a task environment, and recognizes a position of the end effector 113*a* or a current posture of the manipulator 113*b* (refer to FIG. 3), etc. as state information of the robot device 110. Such information acquisition may be performed by the sensing unit 112 (refer to FIG. 3.) of the robot device 110.

The upper controller 114*a* generates an operation command for a task, and transmits to the lower controller 114*b*. Here, the operation command may be transmitted in the form of a goal position of the end effector 113*a* of the robot device 110, a posture of the end effector 113*a*, a posture of the manipulator 113*b*, a motor torque, a motor current, a state-motor torque function, etc. And the operation command may be implemented as one of the above various forms, or may be represented as a combination thereof. As a concrete example, the upper controller 114*a* recognizes a position to drive a nail (a nailing position), and calculates operations of the end effector 113*a* and the manipulator 113*b* for driving a nail into a wall, thereby generating an operation command.

The lower controller 114*b* having received the operation command applies a torque to perform the operation command received from the upper controller 114*a*, to the motor, based on the state information of the robot device 110 and the state information of the task environment 20. Like this, an operation to drive a nail into a wall is performed by the lower controller 114*b*.

Here, the robot device 110 senses an external force and a change of the task environment (S330), and autonomously performs a task (S340). More specifically, the moved motor causes a change of the task environment, and an external force generated at this time and the change of the task environment may be recognized by the sensing unit 112. The sensing unit 112 transmits information required by the lower controller 114*b* and the upper controller 114*a*, to the lower controller 114*b* and the upper controller 114*a*, after a processing to an object recognition, an estimation of a position or a posture, etc. For instance, in case of driving a nail into a wall, the robot device 110 recognizes that a nail is driven (inserted) less under the same force, than in case of driving a nail into a tree. Thus, the upper controller 114*a* transmits a motor torque to drive a nail with a larger force to the lower controller 114*b*, as an operation command, thereby autonomously performing a task to drive a nail into a concrete wall.

Further, in this case, as shown in FIGS. 1B and 7B, it is also possible that the robot device 110 performs a task to drive a nail into different concrete walls. After performing a task to drive a nail into one concrete wall (refer to FIG. 1B), the robot device may perform a task to drive a nail to another concrete wall (refer to FIG. 7B) with a similar force, by recognizing that said another concrete wall is similar to said one concrete wall.

In the aforementioned method to learn a robot task and the robot system according to some example embodiment, a robot task is defined based on force information between the robot and the external environment, such that the robot easily learns various and complicated tasks. Thus, the present disclosure may implement methods to learn to handle a change of an external force of the robot more flexibly, according to a change of a task environment.

The aforementioned method to learn a robot task and the robot system according to some example embodiment may be modified in various manners. For instance, the aforementioned method to learn a robot task and the robot system may be applied to learning of a 1: N robot task control. Hereinafter, a modified example embodiment or other example embodiment of the present disclosure will be explained with reference to FIGS. 8 and 9. In the following modified example embodiment or other example embodiment, the same or similar reference numerals will be provided to the same or similar configurations as or to those of the aforementioned example embodiment, and detailed explanations thereof will be replaced by the aforementioned ones.

Figure 8:
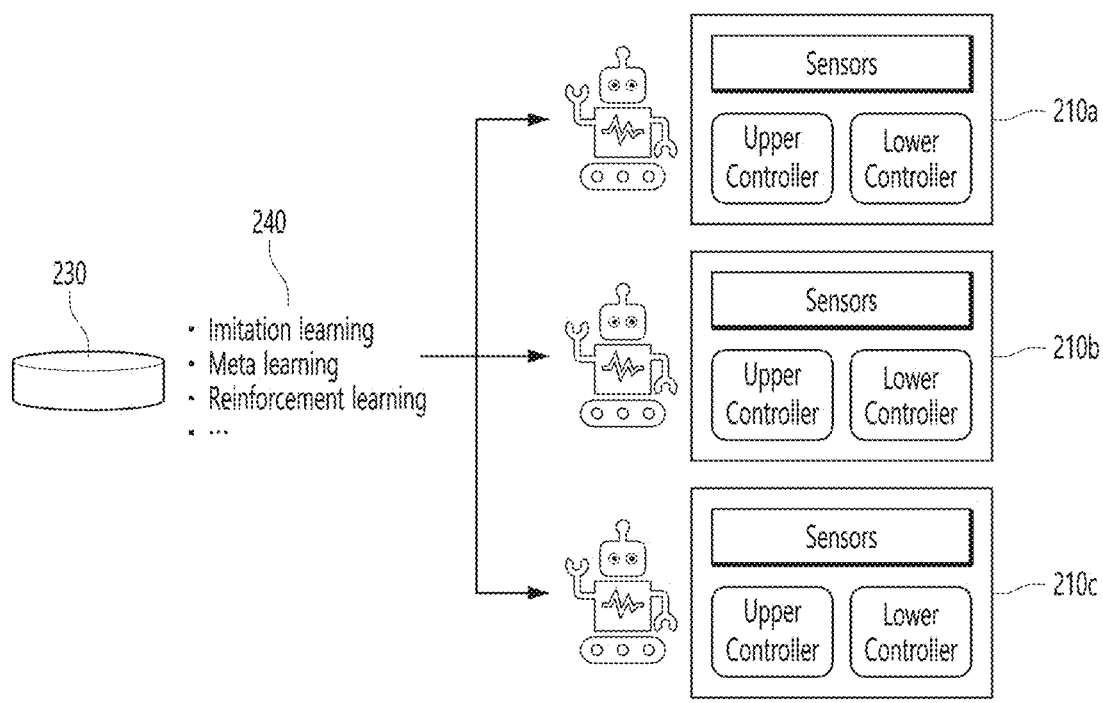
FIGS. 8 and 9 are conceptual views showing methods for learning a robot task and/or robot systems using the same according to some example embodiments.
Figure 9:
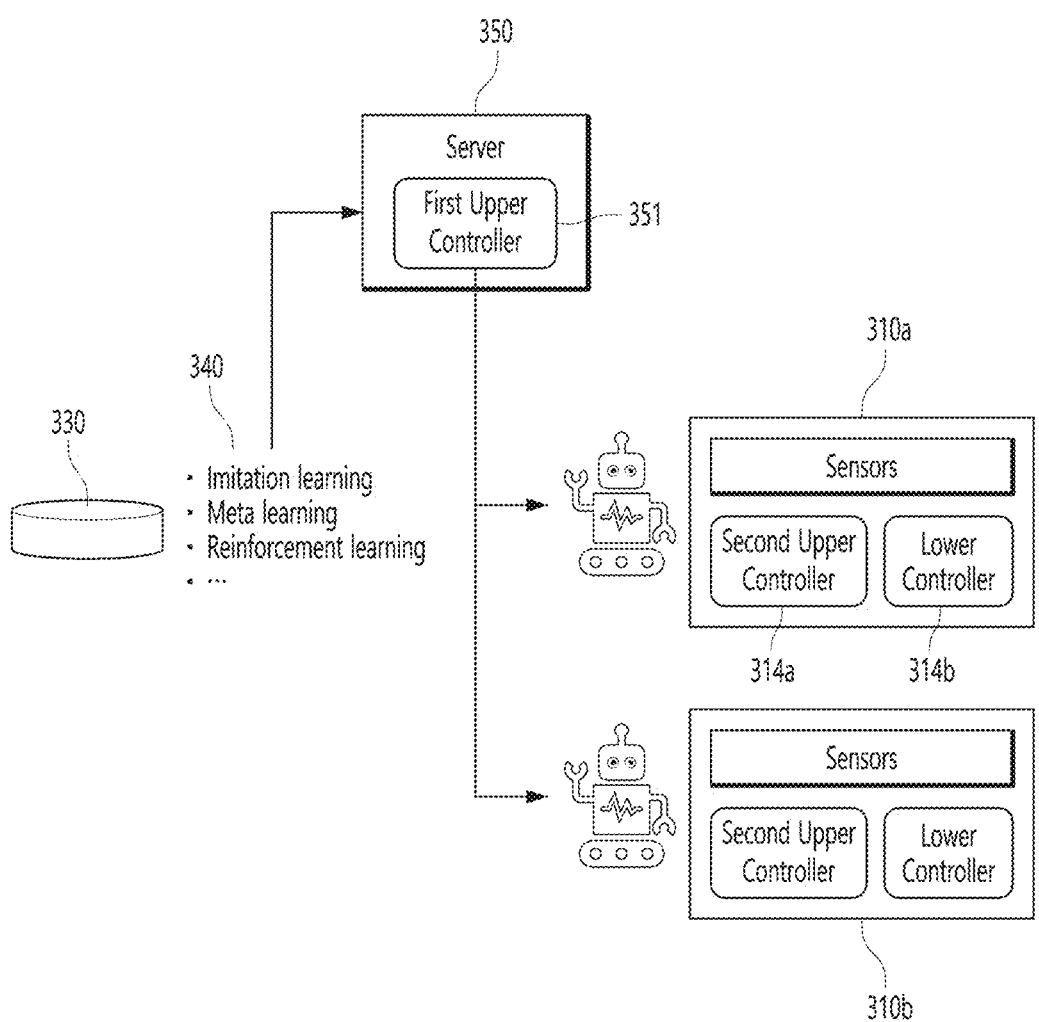

FIGS. 8 and 9 are conceptual views showing methods for learning a robot task and/or robot systems using the same according to some example embodiments.

Referring to the drawings, the robot system may be provided with a plurality of robot devices 210*a*, 210*b*, 210*c*. Referring to FIG. 8, in the robot system, a policy learned by a learning unit 240 may be derived as an upper controller of each of the robot devices.

For instance, the robot system may include at least one of a robot device, an interface device or database, like the robot system aforementioned with reference to FIG. 2. And such the robot system implements the learning method of FIGS. 4 to 7A, by being combined with a user and a task environment.

However, in this example embodiment, the robot device is provided in plurality. For example, the robot system may be provided with a first robot device 210*a*, a second robot device 210*b* and a third robot device 210*c*.

Each of the first robot device 210*a*, the second robot device 210*b* and the third robot device 210*c* may be provided with the components of the robot device aforementioned with reference to FIG. 3. It is possible that each of the first robot device 210*a*, the second robot device 210*b* and the third robot device 210*c* is commonly provided with a sensing unit, an upper controller and a lower controller, but could additionally include other components. For instance, driving units of the first robot device 210*a*, the second robot device 210*b* and the third robot device 210*c* may have different structures. In some example embodiments, the robot devices are robots for professional services, and the first robot device 210*a* may be a leading (conducting) robot, the second robot device 210*b* may be a firefighting robot, and the third robot device 210*c* may be a delivery robot.

In this case, each of the first robot device 210*a*, the second robot device 210*b* and the third robot device 210*c* may be learned so as to be suitable to an individual task, by utilizing the teaching step and the learning step according to some example embodiments of the present disclosure. Accordingly, different policies may be mounted to the upper controllers of the first robot device 210*a*, the second robot device 210*b* and the third robot device 210*c*. Further, each of the lower controllers of the first robot device 210*a*, the second robot device 210*b* and the third robot device 210*c* may be configured to be suitable for usage of the robot.

As another example, referring to FIG. 9, in the robot system, a policy learned by the learning unit may be derived from an additional server, as a part of the controller.

For instance, the robot system may include a robot device, an interface device and database, like the robot system aforementioned with reference to FIG. 2. And such the robot system implements the learning method of FIGS. 4 to 7A, by being combined with a user and a task environment.

However, in this example embodiment, a server 350 is configured to control a plurality of robot devices. For instance, the robot system may be provided with a server 350, a first robot device 310a, and a second robot device 310b.

In this case, an upper controller may include a first upper controller 351, and a second upper controller 314a. The first upper controller 351 is a controller positioned at the server 350, and may be derived by the learning method of FIGS. 4 to 7A. On the contrary, the second upper controller 314a is a controller provided at the robot device 310a, and may be a part pre-programmed regardless of a learning. In this example embodiment, a policy derived by learning is positioned at the server 350 as the first upper controller 351, and is used to control the first robot device 310a and the second robot device 310b through wireless or wired communications.

In this case, a task command transmitted from the server 350 is transferred to the second upper controllers 314a of each of the first robot device 310a and the second robot device 310b, and the second upper controllers 314a transmit an operation command to be performed to the lower controllers 314b.

For instance, if a task to drive a nail is set to the first robot device 310a, the first robot device 310a obtains state information of the robot device and state information of a task environment, and transmits such information to the server 350. Then, the first upper controller 351 of the server 350 generates a task command, and transmits to the second upper controller 314a. Then, the second upper controller 314a converts the task command into a concrete form, such as a target position of an end effector of the first robot device 310a, a posture of the end effector, a posture of a manipulator, a motor torque, a motor current, and a state-motor torque function, and transfers to the lower controller 314b. Here, the server 350 may transfer the task command to the second robot device 310b instead of the first robot device 310a, because it recognizes that the second robot device 310b is positioned closer to a task place than the first robot device 310a. The second robot device 310b may perform a corresponding task by the processes aforementioned with taking the first robot device as an example. Like this, in this embodiment, it is possible for the server to efficiently manage the plurality of robots.

Further, in this example embodiment, a result of learning using one robot device may be utilized to be duplicated to another robot device, for a process. For instance, a task may be learned by the first robot device, a result of the learning may be derived as the first upper controller, and the first upper controller may be commonly applied to the first robot device and the second robot device.

As shown in this example embodiment, the method to learn a robot task and the robot system can be modified into a method to learn a robot task in a one to N manner, and a robot system using the same.

According to the aforementioned example embodiments of the present disclosure, there are provided new learning models for a robot to safely perform various and complicated tasks, or a new methods and/or new systems to learn a robot task based on force information.

According to the aforementioned example embodiments of the present disclosure, a robot task is defined based on force information between the robot and the external environment, such that the robot easily learns various and complicated tasks. Accordingly, a learning method may more flexibly handle a change of an external force of a robot according to a change of a task environment.

Various units and/or modules (e.g., driving unit, sensing unit, communication unit, wireless internet module, short-range communication module, location information module, power supply unit) disclosed in the present disclosure may include or may be implemented as processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

A definition of a robot task using information about a posture and a position has a problem that a new modeling should be derived when an external environment changes. However, according to the present disclosure, as a new type of robot task is defined based on force information, such a problem can be solved.

Further, according to the aforementioned example embodiments of the present disclosure, as the interface device having a haptic function is used, an expert performs teaching of the robot by having feedback from a force applied to the robot in a substantial or an actual environment. That is, task teaching based on a force may be performed in various environments. In this case, the robot acquires information for a task in a substantial environment, and utilizes to learning. Accordingly, the robot may learn a task requiring force information.

Further, according to the aforementioned example embodiments of the present disclosure, because the robot may learn an expert's task command, a multi-joint robot may perform a more effective learning. This may allow a plurality of tasks to be handled flexibly at various situations, by using a high degree of freedom of the multi-joint robot. In this case, the robot may perform a new task rapidly, by using past learning information together. Further, as teaching may be performed by using a haptic device without each programming, time and efforts taken for a learning may be reduced.

Further, according to the aforementioned example embodiments of the present disclosure, the lower controller transmits and receives information to and from the interface device in the teaching step, and the upper controller is derived in the learning step, based on the information obtained in the teaching step. This can allow a learning and a robot control to be performed more efficiently. In this case, the upper controller may be implemented as a common middleware, and may be provided as task programs for different robots. This may allow a replacement of the robot, a change of a task plan, or observance of a safety standard by the robot, to be performed more easily.

The configurations and methods of the method to learn a robot task and the robot system in the aforesaid example embodiments may not be limitedly applied, but may be configured or modified by a selective combination of all or part of the example embodiments so as to implement many variations.

What is claimed is:
1. A robot system, comprising:
 a robot configured to perform a task, and detect force information related to the task;
 a haptic controller configured for a user to manipulate the robot to teach the task, the haptic controller configured to output haptic feedback based on the force information from the robot such that the user feels the force information at the robot at a time of the robot performing the task, while teaching of the task to the robot is performed;
a sensor configured to sense first information related to a task environment of the robot and second information related to a driving state of the robot, while the teaching is performed by the haptic controller for outputting the haptic feedback; and
a database configured to store the first information and the second information sensed by the sensor as time-series data together with a teaching command; and
a computer configured to learn a motion of the robot related to the task through a machine learning by using the first information and the second information stored in the database, such that the robot autonomously performs the task,
wherein the first information includes at least one of a capturing image, a distance from an object or a temperature of the task environment.

2. The robot system of claim 1, wherein
the sensor is configured to detect an external force applied to the robot while the teaching is performed by the haptic controller, and
the haptic controller is configured to output the haptic feedback based on the external force.

3. The robot system of claim 2, wherein the haptic feedback is implemented as a force corresponding to the external force that is transmitted by the haptic controller to the user, for the teaching of the task to the robot based on the force information.

4. The robot system of claim 3, wherein both the first information relating to the task environment of the robot and the second information relating to the driving state of the robot changes according to the teaching of the task to the robot based on the force information.

5. The robot system of claim 1, wherein the robot includes:
a lower controller configured to receive a teaching command of the task, from the haptic controller;
a driver configured to perform a driving according to the teaching command, under control of the lower controller; and
an upper controller configured to drive the driver by controlling the lower controller.

6. The robot system of claim 5, wherein the lower controller is configured to control the driver by receiving the teaching command from the haptic controller, and transmit the force information to the haptic controller as haptic information.

7. The robot system of claim 5, wherein the computer is configured to derive at least a part of the upper controller by performing learning of the motion of the robot related to the task based on the first information and the second information.

8. The robot system of claim 7, wherein the upper controller is configured to generate a control command with respect to the lower controller such that the robot autonomously performs the task based on the learning.

9. The robot system of claim 7, wherein the upper controller includes a first controller and a second controller, the first controller being a part preset to drive the robot, and the second controller being a part derived by the learning and configured to interwork with the first controller.

10. The robot system of claim 5, wherein
the computer is configured to derive the upper controller by using the time-series data.

11. The robot system of claim 5, wherein the driver includes a motor configured to be driven in a quasi-direct-drive manner.

12. The robot system of claim 11, wherein the sensor is configured to detect the force information by sensing a force applied to an output terminal of the motor as an electric energy of an input terminal.

13. The robot system of claim 11, wherein
the second information includes at least one of an angle of the motor, an acceleration, an angular speed, or a torque or a current applied to the motor.

14. A robot comprising:
a first controller configured to receive a teaching command of a task, from a haptic controller, the haptic controller configured for a user to manipulate the robot to teach the task, the haptic controller configured to output haptic feedback based on force information from the robot such that the user feels the force information at the robot at a time of the robot performing the task, while teaching of the task to the robot is performed;
a driver having a multi-joint, the driver configured to perform a driving according to the teaching command under control of the first controller;
a sensor configured to sense first information related to a task environment of the robot and second information related to a driving state of the robot and store, in a database, the first information and the second information as time-series data with the teaching command, while the driver is driven under the control of the first controller; and
a second controller configured to drive the driver by controlling the first controller,
wherein the robot is configured to perform learning of the task through a machine learning by using the first information and the second information stored in the database,
wherein the second controller is configured to generate a control command with respect to the first controller such that the robot autonomously performs the task based on the learning of the task, and
wherein the first information includes at least one of a capturing image, a distance from an object or a temperature of the task environment.

15. The robot of claim 14, wherein the first controller is configured to transmit an external force of the driver to the haptic controller as haptic information, while controlling the driver according to the teaching command of the task.

16. The robot of claim 15, wherein both the first information relating the task environment of the robot and the second information relating to the driving state of the robot changes according to teaching of the task to the robot based on the haptic information.

17. The robot of claim 14, wherein at least a part of the second controller is configured to be derived by using the first information and the second information as the learning of the task is performed.

18. A method for learning a robot task, comprising:
performing teaching of a robot task based on an external manipulation of a haptic controller, the haptic controller configured for a user to manipulate a robot to teach the robot task;
transmitting a driving command corresponding to the external manipulation to the robot by the haptic controller, and outputting haptic feedback by the haptic controller based on force information from the robot such that the user feels the force information at the robot at a time of the robot performing the robot task, while teaching of the robot task to the robot is performed;

sensing first information related to a task environment of the robot and second information related to a driving state of the robot by a sensor, while the robot performs the robot task according to the driving command;

storing, in a database, the first information and the second information sensed by the sensor as time-series data together with a teaching command; and performing learning of the robot task through a machine learning by using the first information and the second information stored in the database, wherein the first information includes at least one of a capturing image, a distance from an object or a temperature of the task environment.

19. The method of claim 18, further comprising:

deriving at least a part of a controller of the robot through the learning of the robot task, and autonomously performing the robot task by the robot through the controller.

20. The method of claim 19, wherein the controller includes an upper controller and a lower controller, the lower controller is configured to control a driver of the robot by receiving the driving command in the performing teaching of the robot task, and the upper controller is configured to control the lower controller in the autonomously performing the robot task, and at least a part of the upper controller is configured to be derived through the learning of the robot task.

* * * * *